United States Patent [19]

Kikushima et al.

[11] Patent Number: 5,133,434
[45] Date of Patent: Jul. 28, 1992

[54] VARIABLE DAMPING FORCE SHOCK ABSORBER WITH FEATURE OF INDEPENDENT ADJUSTMENT OF DAMPING CHARACTERISTICS FOR BOUNDING A REBOUNDING STROKES

[75] Inventors: Shigeru Kikushima; Fumiyuki Yamaoka, both of Kanagawa, Japan

[73] Assignee: Atsugi Unisia Corporation, Japan

[21] Appl. No.: 536,771

[22] Filed: Jun. 12, 1990

[30] Foreign Application Priority Data

Jun. 15, 1989 [JP] Japan ................... 1-70348[U]
Aug. 29, 1989 [JP] Japan ................... 1-222631

[51] Int. Cl.⁵ ............................................. F16F 9/44
[52] U.S. Cl. ........................... 188/319; 188/299; 137/493.9
[58] Field of Search ............ 188/299, 319, 322.15; 137/493.9

[56] References Cited

U.S. PATENT DOCUMENTS

| | | | |
|---|---|---|---|
| 2,487,472 | 11/1949 | Patriquin | 188/319 |
| 3,827,538 | 8/1974 | Morgan | 188/299 X |
| 4,535,877 | 8/1985 | Shimokura | 137/614.2 X |
| 4,660,689 | 4/1987 | Hayashi et al. | 188/319 |
| 4,905,799 | 3/1990 | Yamaoka et al. | 188/282 X |

FOREIGN PATENT DOCUMENTS

| | | |
|---|---|---|
| 0337797 | 10/1989 | European Pat. Off. . |
| 2945015 | 10/1981 | Fed. Rep. of Germany ...... 188/319 |
| 3334704 | 4/1985 | Fed. Rep. of Germany . |
| 3608738 | 9/1987 | Fed. Rep. of Germany . |
| 1094331 | 5/1955 | France . |
| 61-164836 | 10/1986 | Japan ................... 188/319 |
| WO8707565 | 12/1987 | PCT Int'l Appl. . |
| 1236090 | 6/1971 | United Kingdom . |

*Primary Examiner*—George E. A. Halvosa
*Attorney, Agent, or Firm*—Ronald P. Kananen

[57] ABSTRACT

A variable damping force shock absorber has a two separate bounding and rebounding fluid flow path, which the bounding fluid path is active for permitting fluid flow in a piston bounding stroke and the rebounding fluid path is active for permitting fluid flow in a piston rebounding stroke. A first flow restriction device is associated with the bounding fluid path for adjusting fluid flow path area of the bounding fluid path, which first flow restriction device is variable of magnitude of fluid flow restriction for adjusting damping characteristics for piston bounding stroke. A second flow restriction device is associated with the rebounding fluid flow path, which second flow restriction device is variable of flow restriction magnitude for adjusting damping characteristics for piston rebounding stroke. The first and second flow restriction devices are operable independently of each other.

21 Claims, 7 Drawing Sheets

VARIABLE DAMPING FORCE SHOCK ABSORBER WITH FEATURE OF INDEPENDENT ADJUSTMENT OF DAMPING CHARACTERISTICS FOR BOUNDING A REBOUNDING STROKES

BACKGROUND OF THE INVENTION

1. Field of the Invention

The present invention relates generally to a variable damping force shock absorber for an automotive suspension system. More specifically, the invention relates to a variable damping shock absorber which can adjust damping characteristics for bounding stroke motion and damping characteristics for rebounding motion independent of each other.

2. Description of the Background Art

A of typical construction a variable damping force shock absorber has been disclosed in Japanese Patent First (unexamined) Publication (Tokkai) Showa 58-77943. The variable damping force shock absorber has a damping characteristics adjusting mechanism which adjusts damping characteristic of the shock absorber irrespective of the stroke direction. Such prior proposed variable damping force shock absorber is not yet complete for achieving satisfactorily level of riding comfort and vehicular driving stability.

Namely, as can be appreciated, the optimal damping characteristics of the bounding motion and rebounding motion is necessaily different from each other in most vibration modes. Therefore, in setting damping guidelines of common damping characteristics both for the bounding motion and the rebounding motion, difficulty arises to determined the optimal damping characteristics both for the bounding motion and rebounding motion, since the optimal damping characteristics for one of the bounding and rebounding motions cannot be the optimal damping characteristics for the other direction of motion. In other words, as long as the common damping characteristics for the bounding and the rebounding motion is to be set, the set damping characteristics can not be optimal for both the bounding and the rebounding motion.

SUMMARY OF THE INVENTION

In view of the drawback in the prior art, it is an object of the present invention to provide a variable damping force shock absorber which has a capability of independent adjustment of the damping characteristics of the bounding and rebounding motion to each other.

In order to accomplish the aforementioned and other objects, a variable damping force shock absorber, according to the present invention, has separate two bounding and rebounding fluid flow path, wherein the bounding fluid path is active for permitting fluid flow in the piston bounding stroke and the rebounding fluid path is active for permitting fluid flow in the piston rebounding stroke. A first flow restriction means is associated with the bounding fluid path for adjusting the fluid flow path area of the bounding fluid path, which first flow restriction means is variable to the magnitude of fluid flow restriction for adjusting the damping characteristics for the piston bounding stroke. A second flow restriction means is associated with the rebounding fluid flow path, which second flow restriction means is variable to the flow restriction magnitude for adjusting the damping characteristics for the piston rebounding stroke. The first and second flow restriction means are operable independently of each other.

According to one aspect of the invention, a variable damping force shock absorber comprises:

a hollow cylinder filled with a working fluid;

a piston disposed within the interior space of the cylinder for separating the interior space of the cylinder into first and second fluid chambers, the piston being connected to a piston rod for thrusting movement within the interior space in response to an input of vibration energy in the expansion and compression modes;

a first fluid path means for permitting fluid flow from the first fluid chamber to the second fluid chamber in response to a piston compression stroke;

a first variable orifice means disposed within the first fluid path for restricting fluid flow through the first fluid path means, the variable orifice means varying magnitude of the flow restriction;

a second fluid path means for permitting fluid flow from the second fluid chamber to the first fluid chamber in response to the piston expansion stroke;

a second variable orifice means disposed within the second fluid path for restricting fluid flow through the second fluid path means, the variable orifice means varying magnitude of the flow restriction;

a first control means, associated with the first variable orifice means, for operating the latter to adjust the flow restriction magnitude for the fluid flow therethrough; and a second control means, associated with the second variable orifice means, for operating the latter to adjust the flow restriction magnitude for the fluid flow therethrough, the second control means being independent of the first control means for adjusting the flow restriction magnitude independently of the first control means.

At least one of the first and second variable orifice means may vary damping characteristics in a continuous fashion. The first and second control means are provided through the piston rod. The first and second control means comprise rotary shaft members coaxially arranged through the piston rod, which rotary shafts are driven by an externally applied driving force and converting means cooperating with the rotary shafts for converting rotation of the rotary shaft into a thrusting force for adjusting the path area of said first and second variable orifices.

BRIEF DESCRIPTION OF THE DRAWINGS

The present invention will be understood more fully from the detailed description given herebelow and from the accompanying drawings of the preferred embodiment of the invention, which, however, should not be taken to limit the invention to the specific embodiment but are for explanation and understanding only.

In the drawings.

DESCRIPTION OF THE PREFERRED EMBODIMENT

Figure 1:
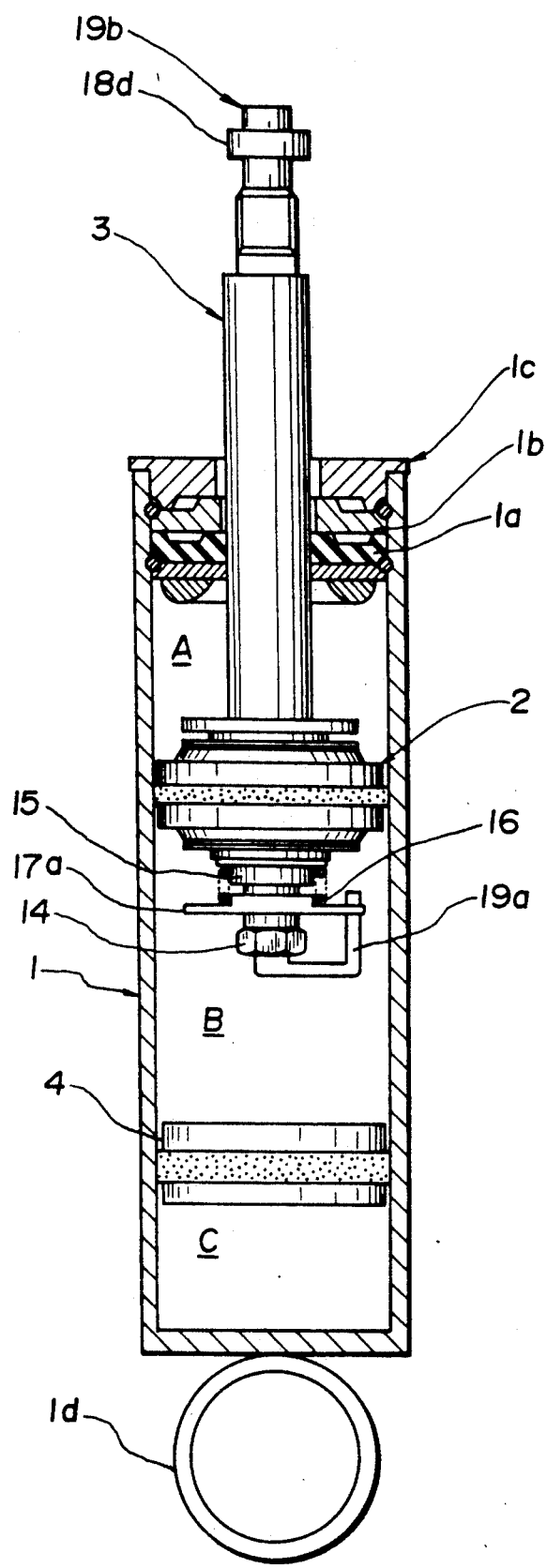
FIG. 1 is a section of the first embodiment of a variable damping force shock absorber according to the present invention.
Figure 2:
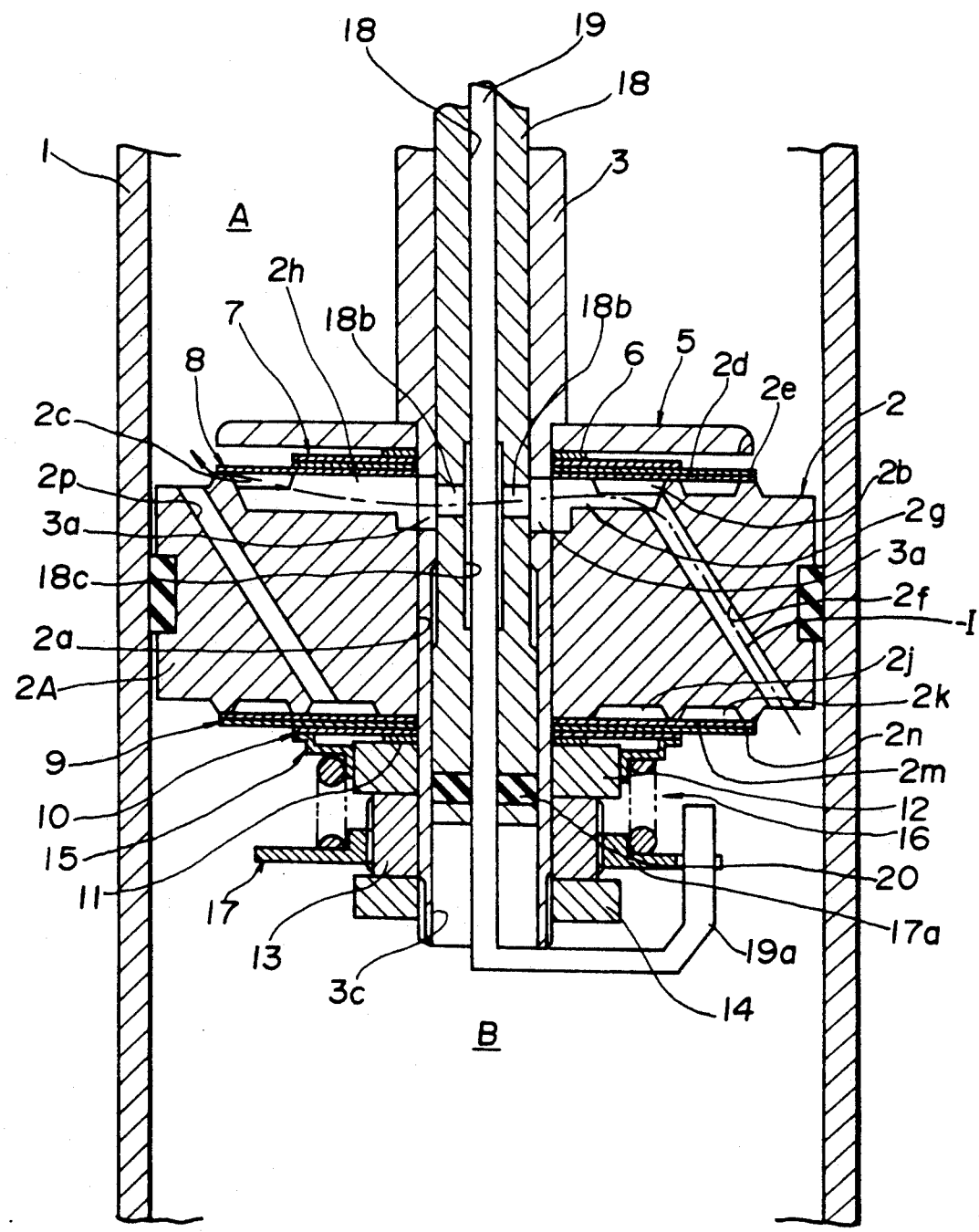
FIG. 2 is an enlarged section of the first embodiment of the variable damping force shock absorber of FIG. 1, showing the major part.

Referring now to the drawings, particularly to FIGS. 1 and 2, the first embodiment of a variable damping force shock absorber, according to the present invention, has a hollow cylinder 1 defining an interior space filled with a working fluid. The interior space of the cylinder 1 is separated into upper and lower fluid chambers A and B by means of a piston assembly 2. As can be seen, in the shown embodiment, a free piston 4 is provided within the interior space of the cylinder 1 to define a gas chamber C beneath the lower fluid chamber B. The gas chamber C is filled with a pressurized gas for variation of the volume of the chamber C in terms of the pressure in the lower fluid chamber for establishing the force balance and thus serves as a pressure accumulator.

The open end of the cylinder 1 is closed by an upper plug assembly including an oil seal 1a, a rod guide 1b and a packing ground 1c. On the other hand, the bottom of the cylinder 1 is closed and is provided with a eye ring 1d to receive therethrough a wheel axle or spindle or the like.

The piston assembly 2 is mounted on the lower end of the piston rod 3. The piston assembly 2 includes a rebounding stopper 5, a washer 6, a first bounding side disc valve 7, a second bounding side disc valve 8, a piston body 2A, a second rebounding side disc valve 9, a first rebounding side disc valve 10, a washer 11, a first collar 12 and a second coller 13. The components of the piston assembly 2 are assembled in order on the lower end of the piston rod 3 and fixed in the assembled form by means of a fastening nut 14 which engages with the threaded lower end of the piston rod.

The piston body 2A is formed with a central opening 2a extending axially and adapted to receive the piston rod 3. The piston body 2A has an upper surface opposing the upper fluid chamber A. A pair of grooves 2b and 2c are formed on the upper surface. The pair of grooves 2b and 2c extend essentially in annular fashion in coaxial relationship to each other. Along the circumferential edge of the annular grooves 2b and 2c, essentially circular lands with valve seat surfaces 2d and 2e to mate with the second bounding side disc alve 8, so as to form inner and outer variable orifices. As can be seen, the diameter of the seat surface 2d corresponds to the outer diameter of the first bounding side disc valve 7. The inner annular groove 2b is communicated with the lower fluid chamber B via one or more bounding fluid path openings 2f which has lower end opening directly to the lower fluid chamber. The inner annular groove 2b is further communicated with the central opening 2a via a radial groove 2g and with the outer annular groove 2b via a radial groove 2h. One or more ports 3a are formed through the piston rod 3 for establishing fluid communication between the exterior and the interior space defined by the axial opening. Therefore, the central opening 2a of the piston body 2A is communicated with the interior space of the piston rod 3 via the ports 3a. The ports 3a are communicated with radial paths 18b formed through an outer rotary actuation rod 18 and an essentially annular groove 18c defined between the inner periphery of the outer rotary actuation rod 18 and an inner rotary actuation rod 19.

It should be appreciated that, the radial paths 18b include a plurality of sets of paths having mutually different diameters. One of the plurality of sets of paths are aligned with the radial path for adjusting flow restriction magnitude.

As result, the working fluid in the lower fluid chamber B may flow into the upper fluid chamber A via the bounding fluid path opening 2f, the inner groove 2b, the radial path 2g, the radial port 3a, the radial path 18b, the annular groove 18c, the radial port 3a, the radial groove 2h, during piston bounding stroke.

Similarly, essentially annular grooves 2j and 2k are arranged on the lower surface of the piston body 2A. Essentially annular lands with valve seat surfaces 2m and 2n extends along the respective peripheries of the inner and outer annular grooves 2j and 2k. The inner annular groove 2j is in fluid communication with the upper fluid chamber A via one or more rebounding fluid paths 2p which directly open to the upper fluid chamber.

The seat surfaces 2m and 2n mate with the second rebounding side disc valve 9. Similarly to the seat surface 2d, the seat surface 2m has a diameter corresponding to the outer diameter of the first rebounding side disc valve 7. In addition, a spring seat member 15, movable about the outer periphery of the first collar 12 and having an outer diameter corresponding to the diameter of the seat surface 2m, abuts against the first rebounding side disc valve 10 for transferring the spring force of a coil spring 16. The lower end of the coil spring 16 is seated on a spring seat member 17. The spring seat member 17 has a threaded bore engaging with a thread on the outer periphery of the second coller 13. With this construction, when the spring seat member 17 is driven to rotate, it causes axial displacement toward and away from the spring seat member 15 for causing variation of the spring force to be exerted on the first rebounding side disc valve 10.

The spring seat member 17 is formed with a cut-out 17a. The inner rotary rod 19 has an extension 19a extending from the lower end of the piston rod 3 and turned to engage with the cut-out 17a at the end thereof.

Figure 3:
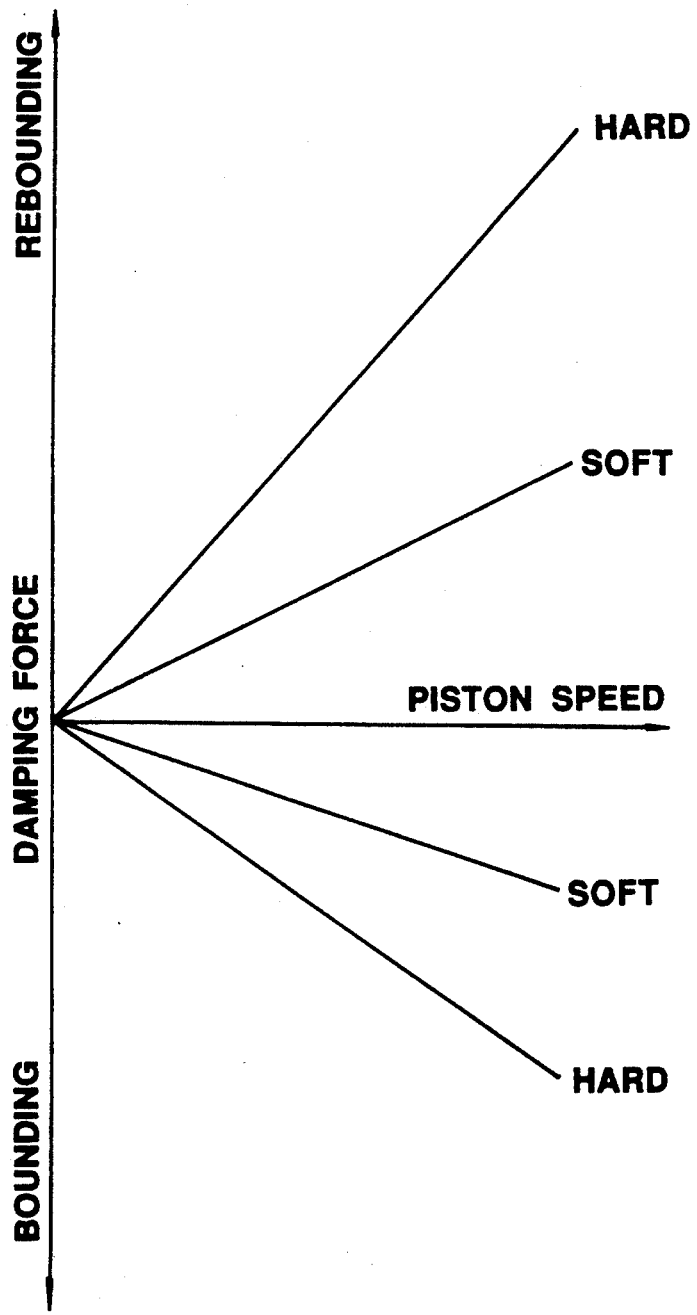
FIG. 3 is a chart showing the damping characteristics of the first embodiment of the shock absorber in various operational mode and vibration mode.

With the shown construction, when the piston strokes in a rebounding direction causing compression of the upper fluid chamber A, the pressurized fluid in the upper fluid chamber flows into the inner annular groove 2j via the rebounding fluid paths 2p. Therefore, fluid pressure is exerted on the second rebounding side disc valve 9 to cause deformation of the disc valves 9 and 10. Accordingly, the pressurized fluid in the inner annular groove 2j flows into the outer annular groove 2k via a gap formed between the seat surface 2m and the mating surface of the second rebounding side disc valve 9. Also, deformation of the second rebounding disc valve 9 permits fluid flow from the outer annular groove 2k to the lower fluid chamber B. During this fluid flow, the variation of the damping force generated by an inner variable orifice defined between the seat surface 2m and the associated portion of the second rebounding disc valve 9, is proportional to ⅔ power of the piston stroke speed. Similarly, the variation of the damping force generated by an outer variable orifice defined between the seat surface 2n and the associated portion of the second rebounding disc valve 9, is proportional to ⅔ power of the piston stroke speed. In addition, since the spring force exerted position of the second rebounding disc valve 9, associated with the seat surface 2m is greater than that exerted on the portion associated with the seat surface 2n, greater damping force can be generated by an inner variable orifice. That is to say, the inner variable orifice may provide harder damping characteristics than that of the outer variable orifice. In the shown embodiment, since the inner variable orifice with the harder damping characteristics and the outer variable orifice with the softer damping characteristics are arranged in series, lowering of the variation rate of the damping force at medium and high piston speed range can be compensated to provide essentially linear damping characteristics as shown in FIG. 3.

The damping characteristics in response to the piston rebounding motion can be adjusted by rotatingly driving the inner rotary rod 19. For driving the inner rotary rod 19, an operation dial or handle 19b is provided at the top of the rod. Rotation of the rotary rod 19 may cause rotation of the spring seat member 17 for adjusting the spring force to be exerted on the first rebounding disc valve 9. Namely, when the spring seat member 17 is oriented at the lowermost position to define the predetermined largest distance from the spring seat member 15, then the spring force to be exerted on the first rebounding disc valve 9 becomes minimal to initiate deformation of the first and second rebounding disc valves 9 and 10 at a lower pressure difference between the inner and outer annular grooves 2j and 2k and the lower fluid chamber B.

On the other hand, when the piston strokes in the bounding direction causing compression of the lower fluid chamber B, the pressurized fluid in the lower fluid chamber flows into the inner annular groove 2b via the bounding fluid paths 2f. Therefore, fluid pressure is exerted on the first bounding side disc valve 7 to cause deformation of the disc valves 9 and 10. Accordingly, the pressurized fluid in the inner annular groove 2b flows into the outer annular groove 2c via a variable orifice constituted of the radial path 18b. Then the pressurized fluid flows through a gap formed between the seat surface 2e and the mating surface of the second bounding side disc valve 8. Also, deformation of the second bounding disc valve 8 permits fluid flow from the outer annular groove 2c to the upper fluid chamber A. On the other hand, when the fluid pressure difference between the annular grooves and the upper fluid chamber becomes great enough to overcome the bias force of the bounding disc valves 7 and 8, the disc valves are deformed to form gaps between the associated seat surfaces 2d and 2e to permit the fluid flow therethrough.

During this fluid flow, the radial paths 18b serve as a fixed orifice which has variation characteristics of the damping force proportional to square of the piston stroke speed. On the other hand, the variation of the damping force generated by an inner variable orifice defined between the seat surfaces 2d and 2e and the associated portion of the second bounding disc valve 8, is proportional to ⅔ power of the piston stroke speed. In the combination of the damping characteristics of the fixed orifice and that of the variable orifice, essentially linear damping characteristics can be obtained as shown in FIG. 3.

The damping characteristics in response to the piston to bounding motion can be adjusted by rotatingly driving the outer rotary actuation rod 18. For driving the outer rotary actuation rod 18, an operation dial or handle 18d is provided at the top of the rod. Rotation of the rotary rod 18 may cause displacement of the radial paths 18b so that the different path areas of the radial paths 18b may be aligned with the port 3a.

As can be appreciated, the shown embodiment of the variable damping force shock absorber permits independent adjustment of damping characteristics for bounding and rebounding piston stroke.

Figure 4:
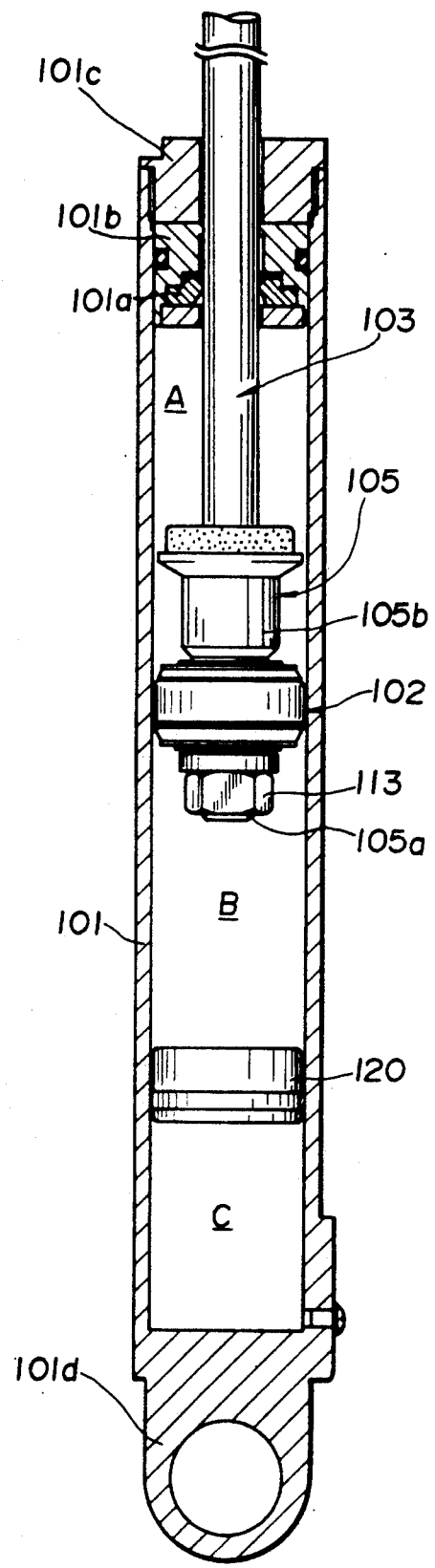
FIG. 4 is a section of the second embodiment of a variable damping force shock absorber according to the present invention.
Figure 5:
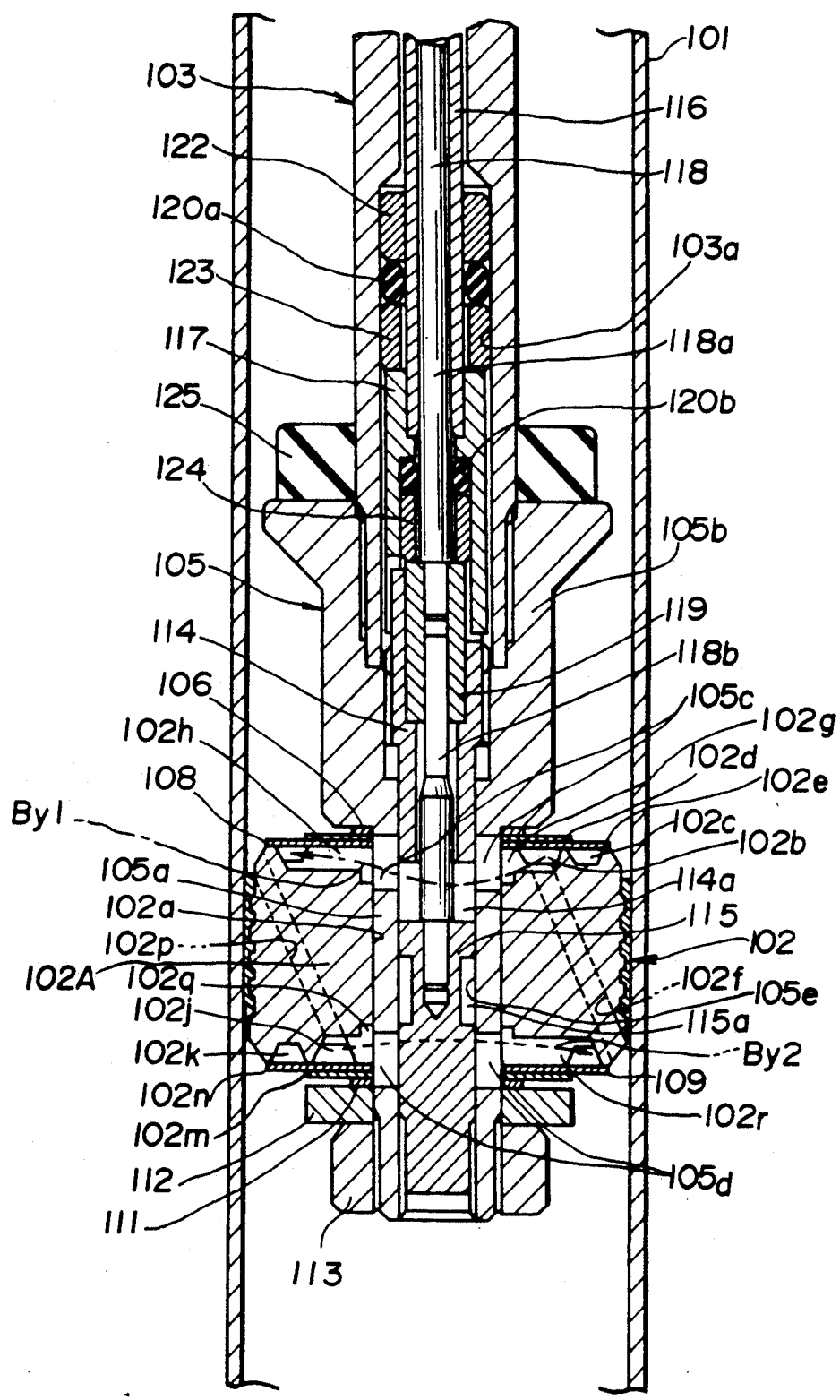
FIG. 5 is an enlarged section of the second embodiment of the variable damping force shock absorber of FIG. 4, showing the major part.
Figure 6:
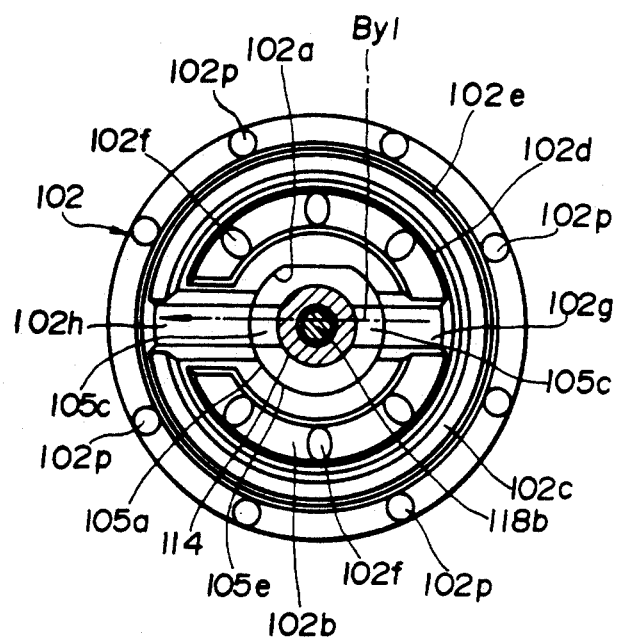
FIG. 6 is a plan view of a piston employed in the second embodiment of the variable damping force shock absorber of FIG. 4.

FIGS. 3 to 5 show another embodiment of the variable damping force shock absorber according to the present invention. Similarly to the former embodiment, the shown embodiment of the variable damping force shock absorber has a hollow cylinder 101 defining an interior space filled with a working fluid. The interior space of the cylinder 101 is separated into upper and lower fluid chambers A and B by means of a piston assembly 102. As can be seen, in the shown embodiment, a free piston 120 is provided within the interior space of the cylinder 101 to define a gas chamber C beneath the lower fluid chamber B. The gas chamber C is filled with pressurized gas for variation of the volume in the chamber in terms of the pressure in the lower fluid chamber for establishing force balance and thus serves as a pressure accumulator. The open end of the cylinder 101 is closed by an upper plug assembly including an oil seal 101a, a rod guide 101b and a packing ground 101c. On the other hand, the bottom of the cylinder 101 is closed and is provided with a eye ring 101d to receive therethrough a wheel axle or spindle or the like.

A piston assembly 102 is mounted on the lower smaller diameter section 105a of a stud 105 which is, in turn, fitted onto the lower end of the piston rod 103. The piston assembly 102 includes a washer 106, a bounding side disc valve 108, a piston body 102A, a rebounding side disc valve 109, a washer 111 and a collar 112. The components of the piston assembly 102 are assembled in order on the lower end of the piston rod 103 and fixed in the assembled form by means of a fastening nut 113 which engages with the threaded lower end of the piston rod.

The piston body 102A is formed with a central opening 102a extending axially and adapted to receive the smaller diameter section 105a of the stud 105. The piston body 102A has an upper surface opposing to the upper fluid chamber A. A pair of grooves 102b and 102c are formed on the upper surface. The pair of grooves 102b and 102c extend essentially in annular fashion in coaxial relationship to each other. Along the circumferential edge of the annular grooves 102b and 102c, essentially circular lands with valve seat surfaces 102d and 102e to mate with the bounding side disc valve 108, so as to form inner and outer variable orifices. The inner annular groove 102b is communicated with the lower fluid chamber B via one or more bounding fluid path openings 102f which has lower end opening directly to the lower fluid chamber. The inner annular groove 102b is further communicated with the central opening 102a via a radial groove 102g and with the outer annular groove 102b via a radial groove 102h. One or more ports 105c are formed through the smaller diameter section 105a of the stud 105 at an axial orientation essentially corresponding to the radial groove 102g for establishing fluid communication between the exterior and the interior space defined by the axial opening. Therefore, the central opening 102a of the piston body 102A is communicated with the interior space of the smaller diameter section 105a of the stud 105 via the ports 105c. The ports 102a are communicated with the radial paths 114a defined between a rebounding side valve spool 114 and a bounding side valve spool 115. The lower end shoulder of the rebounding side valve spool 114 is cooperative with the upper end shoulder of the ports 105c for forming a variable path area throttling orifice variable of the path area corresponding to the axial position of the rebounding side valve spool 114. With the shown construction, a fluid path By1 is established.

As can be appreciated, the path area of the variable path area throttling orifice defined between the port 105c and the lower end shoulder of the rebounding side valve spool 114 can be varied continuously or at least in non-stepwise fashion.

As result, the working fluid in the lower fluid chamber B may flow into the upper fluid chamber A via the bounding fluid path opening 102f, the inner groove 102b, the radial path 102g, the radial port 105c, the radial path 114a, the radial port 115c, the radial path 102h, during piston bounding stroke.

Similarly, essentially annular grooves 102j and 102k are arranged on the lower surface of the piston body 102A. Essentially annular lands with valve seat surfaces 102m and 102n extends along the respective pheripheries of the inner and outer annular grooves 102j and 102k. The inner annular groove 102j is in fluid communication with the upper fluid chamber A via one or more rebounding fluid paths 102p which directly open to the upper fluid chamber.

The inner annular groove 102j is communicated with the outer annular groove 102k via a radial groove 102r. Also, the inner annular groove 102j is in fluid communication with the radial paths 102q. The radial paths 102q are in fluid communication with radial ports 105d. The radial ports 105d may communicated with an annular groove 115a defined on the outer periphery of the bounding side valve spool 115. Therefore, the fluid path By2 is established for permitting fluid flow from the upper fluid chamber A and the lower fluid chamber B.

Similarly to the rebounding side valve spool, the lower end edge of the annular groove 115a of the bounding side valve spool 115 forms a variable path area throttling path together with the upper edge of the radial port 105d (in FIG. 5, the throttling orifice is shown in a position fully blocking fluid communication). As can be appreciated, the path area of the throttling orifice defined between the annular groove 115a and the radial port 105d is variable depending upon the axial position of the bounding side valve spool 115.

Figure 7:
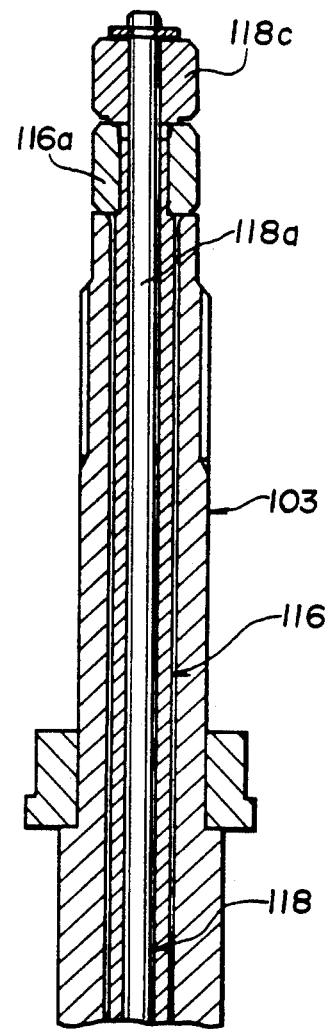
FIG. 7 is an enlarged section showing detailed construction of a piston rod employed in the second embodiment of the variable damping force shock absorber of FIG. 4.

The rebounding side valve spool 114 controls the axial position by a rebounding side valve control rod 116 coaxially arranged within the axial bore 103a of the piston rod 103. The rebounding side valve control rod 116 extends to the top end of the piston rod as shown in FIG. 7. On the other hand, the lower end of the rebounding side valve control rod 116 is connected to a rebounding side joint 117. The rebounding side joint 117 has a lower end mating with the top end of the rebounding side valve spool 114 for interengagement and for permitting the valve spool to shift in an axial direction. At this condition, the rebounding side joint 117 transmits the rotational torque on the rebounding side valve control rod 116 to the rebounding side valve spool 114. The rebounding side valve spool 114 has a threaded outer periphery meshing with the thread on the inner periphery of the bore 105e defined in the stud 105. Therefore, rotation of the rebounding side valve spool 114 as driven by the rebounding side valve control rod 116 causes axial shifting of the rebounding side valve spool 114 for causing variation of the path area in the throttling orifice between the valve spool 114 and the radial port 105c.

On the other hand, the axial position of the bounding side valve spool 115 is controlled by means of a bounding side valve control rod 118 coaxially arranged within the interior space of the rebounding side valve control rod 116. The bounding side valve control rod 118 also extends to the top end of the piston rod 103 for external connection with an external driving power source, such as an stepping motor. The lower end of the bounding side valve control rod 118 has a lower end connected to a bounding side joint 119. The bounding side joint 119 is formed into cylindrical construction to have the upper connected to the upper rod 118a of the bounding side valve control rod 118 and the lower end connected to the lower rod 118b of the control rod 118. The lower rod 118b is splined on the inner periphery of the bounding side joint 119 so as to be permitted axial movement relative to the upper rod but can be rotatingly driven together with the upper rod. Since the lower rod 118b is rigidly connected to the bounding side spool 115, rotational torque extered on the upper rod 118a is transmitted to the bounding side valve spool 115. The bounding side valve spool 115 has a threaded outer periphery meshing with the thread formed on the inner periphery of the smaller diameter section 105a of the stud 105. Therefore, by rotatingly driving the bounding side valve spool 115 via the bounding side valve control rod 118, the axial position of the bounding side valve spool relative to the radial port 105d can be adjusted to adjust the throttling rate at the throttling orifice between the annular groove 115a and the radial port 105d.

Figure 8:
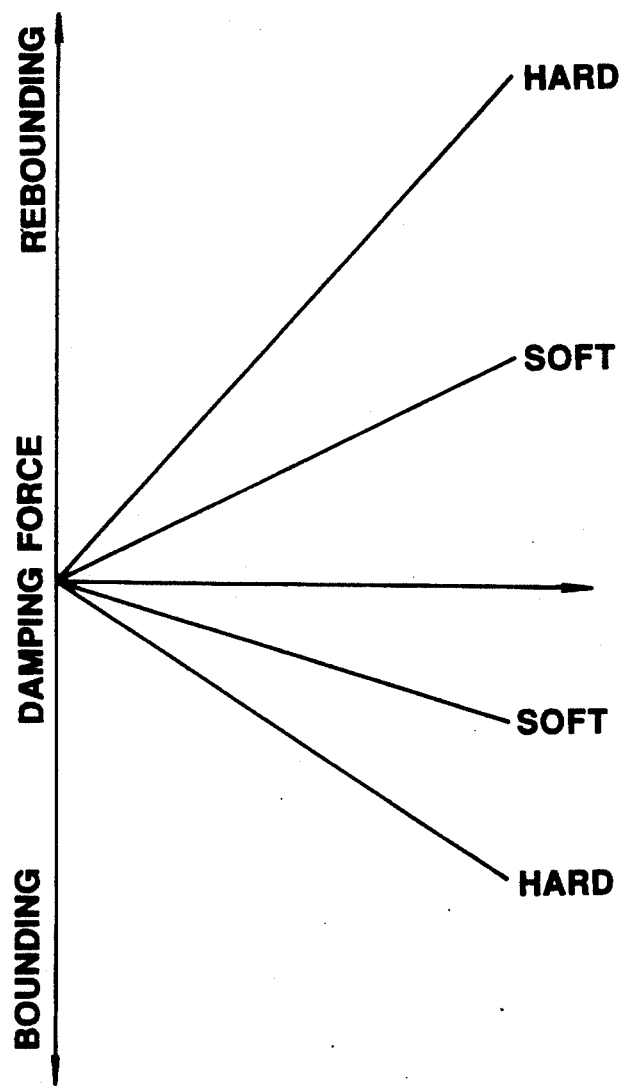
FIG. 8 is a chart showing damping characteristics of the second embodiment of the shock absorber in various operational mode and vibration mode.

With the shown construction set forth above, the damping characteristics equivalent to that obtained in the former embodiment can be obtained as can be clear from FIG. 8 which shows damping characteristics at minimum and maximum throttling rate in the variation path area throttling orifices. In addition, since the shown embodiment may provide non-stepwise or continous variation of the throttling rate, optimal damping characteristics at respective bounding and rebounding modes of vibration can be obtained.

Therefore, the present invention fulfills all of the objects and advantages sought therefor.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments and modifications to the shown embodiments which can be embodied without departing from the principle of the invention set out in the appended claims.

What is claimed is:

1. A variable damping force shock absorber comprising:
   a hollow cylinder filled with a working fluid;

a piston disposed within the interior space of said cylinder for separating the interior space of said cylinder into first and second fluid chambers, said piston being connected to a piston rod for thrusting movement within the interior space in response to input of vibration energy in expansion and compression modes;

a first fluid path means provided in said piston for permitting fluid flow from said first fluid chamber to said second fluid chamber in response to a piston compression stroke;

a first rotary shaft coaxially disposed through said piston rod for defining a first variable orifice means within said first fluid path which restricts fluid flow through said first fluid path means, said rotary shaft being displaced in an axial direction thereof dependent upon its rotation to traverse said first fluid path means for variation in a path area of the first variable orifice means for varying magnitude of flow restriction;

a second fluid path means provided in said piston for permitting fluid flow from said second fluid chamber to said first fluid chamber in response to piston expansion stroke; and a second rotary shaft coaxially disposed through said first rotary shaft which is rotatable independent of the rotation of said first rotary shaft for defining a second variable orifice means within said second fluid path which restricts fluid flow through said second fluid path means, said second rotary shaft being displaced in an axial direction thereof dependent upon its rotation to traverse said second fluid path means for variation in a path area of the second variable orifice means for varying the magnitude of flow restriction.

2. A variable damping force shock absorber as set forth in claim 1, wherein at least one of said first and second variable orifice means varies damping characteristics in continuous fashion.

3. A variable damping force shock absorber as set forth in claim 1, further comprising a supporting member which is attached to the piston rod, said supporting member supporting said first rotary shaft so as to allow it to be moved in an axial direction with rotation thereof, said first rotary shaft supporting said second rotary shaft so as to allow it to be displaced in an axial direction according to its rotation.

4. A variable damping force shock absorber as set forth in claim 3, wherein said first and second rotary shafts include threads on portions thereof, said first rotary shaft being screwed into said supporting member so as to be displaced in an axial direction according to rotation thereof and said second rotary shaft being secured to said first rotary shaft so as to be displaced in an axial direction according to its rotation.

5. A variable damping force shock absorber as set forth in claim 1, wherein said first fluid path means includes inner and outer grooves in a surface of said piston opposing said second fluid chamber which are blocked from said second fluid chamber by a first valve plate, the inner groove being communicated with the outer groove through said first variable orifice means, said second fluid path means including inner and outer grooves in a surface of said piston opposing said first fluid chamber, said grooves of said second fluid path being blocked from said first fluid chamber by a second valve plate, the inner groove of said second fluid path being communicated with said second fluid chamber and also communicated with the outer groove of said second fluid path through said second variable orifice means.

6. A variable damping force shock absorber as set forth in claim 5, wherein both of the inner and outer grooves extend in a substantially annular fashion in coaxial relation to each other.

7. A variable damping force shock absorber as set forth in claim 6, wherein the first and second valve plates are responsive to fluid pressure in said first and second fluid path means lower than a preselected level to establish fluid communication between the outer grooves and said second and first fluid chambers respectively and responsive to fluid pressure in said first and second fluid path means higher than the preselected level to further establish fluid communication between the inner grooves and said second and first fluid chambers respectively.

8. A variable damping force shock absorber comprising:

a hollow cylinder filled with a working fluid;

a piston disposed within the interior space of said cylinder for defining first and second fluid chambers therewithin, said piston being connected to a piston rod for thrusting movement within the interior space in response to input of vibration energy in expansion and compression modes;

a first fluid path provided in said piston for permitting fluid flow from said first fluid chamber to said second fluid chamber in response to a piston compression stroke;

a second fluid path provided in said piston for permitting fluid flow from said second fluid chamber to said first fluid chamber in response to piston expansion stroke;

a first disc valve arranged on a surface of the piston to block an outlet portion of said first fluid path for restricting fluid flow from said first fluid chamber to said second fluid chamber;

a second disc valve arranged on the other surface of the piston to block an outlet portion of said second fluid path for restricting fluid flow from said second fluid chamber to said first fluid chamber;

valve adjusting means for providing force to said second disc valve required for urging said second disc valve against the surface of the piston to restrict fluid flow to said first fluid chamber through said second fluid path by a desired restriction ratio;

a first rotary shaft coaxially disposed through said piston rod for defining a first variable orifice within said first fluid path which restricts fluid flow through said first fluid path, said rotary shaft being displaced dependent upon its rotation to traverse said first fluid path for variation in a path area of the first variable orifice for varying magnitude of flow restriction; and a second rotary shaft coaxially disposed through said first rotary shaft which is rotatable independent of the rotation of said first rotary shaft for activating said valve adjusting means to vary a flow restriction ratio of said second disc valve.

9. A variable damping force shock absorber as set forth in claim 8, wherein said valve adjusting means includes a coil spring and a retaining member which retains the coil spring so as to urge said second valve against the surface of the piston, said second rotary shaft rotating to displace the retaining member for varying a spring force of the coil spring.

10. A variable damping force shock absorber as set forth in claim 9, wherein said first rotary shaft engages an inner surface of the piston rod in a rotatable fashion so that the first rotary shaft is displaced according to rotation thereof, said second rotary shaft being rotatably supported in said first rotary shaft.

11. A variable damping force shock absorber comprising:

a hollow cylinder filled with a working fluid;

a piston disposed within said hollow cylinder for defining first and second fluid chambers therein, said piston being attached to a piston rod for thrusting movement within said hollow cylinder in expansion and compression modes;

a first fluid path provided in said piston for allowing fluid flow from said first fluid chamber to said second fluid chamber in response to piston compression stroke, said first fluid path including inner and outer grooves in a surface of said piston opposing said second fluid chamber which are blocked from said second fluid chamber by a first valve plate, the inner groove being communicated with said first fluid chamber and also communicated with the outer groove;

a first rotary shaft disposed through said piston rod for defining a first variable orifice within said first fluid path to restrict fluid flow between the inner and outer grooves, said rotary shaft being displaced dependent upon its rotation to traverse said first fluid path for variation in a path area of said first variable orifice for varying magnitude of flow restriction;

a second fluid path provided in said piston for allowing fluid flow from said second fluid chamber to said first fluid chamber in response to piston expansion stroke, said second fluid path including inner and outer grooves in a surface of said piston opposing said first fluid chamber which are blocked from said first fluid chamber by a second valve plate, the inner groove of said second fluid path being communicated with said second fluid chamber and also communicated with the outer groove of said second fluid path; and a second rotary shaft disposed through said first rotary shaft which is rotatable independent of the rotation of said first rotary shaft for defining a second variable orifice within said second fluid path to restrict fluid flow between the inner and outer grooves of said second fluid path, said second rotary shaft being displaced dependent upon its rotation to traverse said second fluid path for variation in a path area of the second variable orifice for varying magnitude of flow restriction.

12. A variable damping force shock absorber as set forth in claim 11, wherein both of the inner and outer grooves extend in a substantially annular fashion in coaxial relation to each other.

13. A variable damping force shock absorber as set forth in claim 12, wherein the first and second valve plates are responsive to fluid pressure in said first and second fluid paths lower than a preselected level to establish fluid communication between the outer grooves and said second and first fluid chambers respectively and responsive to fluid pressure in said first and second fluid paths higher than the preselected level to further establish fluid communication between the inner grooves and said second and first fluid chambers respectively.

14. A variable damping force shock absorber as set forth in claim 13, said first rotary shaft is displaced in an axial direction thereof dependent upon its rotation to traverse said first fluid path for variation in the path area of the first variable orifice, said second rotary shaft being displaced in an axial direction thereof dependent upon its rotation to traverse said second fluid path for variation in the path area of the second variable orifice.

15. A variable damping force shock absorber as set forth in claim 14, further comprising a supporting member which is attached to the piston rod, said supporting member supporting said first rotary shaft so as to allow it to be moved in an axial direction with rotation thereof, said first rotary shaft supporting said second rotary shaft so as to allow it to be displaced in an axial direction according to its rotation.

16. A variable damping force shock absorber as set forth in claim 15, wherein said first and second rotary shafts include threads on portions thereof, said first rotary shaft being screwed into said supporting member so as to be displaced in an axial direction according to rotation thereof and said second rotary shaft being secured to said first rotary shaft so as to be displaced in an axial direction according to its rotation.

17. A variable damping force shock absorber comprising:

a hollow cylinder filled with a working fluid;

a piston disposed within said hollow cylinder for defining first and second fluid chambers therein, said piston being attached to a piston rod for thrusting movement within said hollow cylinder in first and second stroke modes, the first stroke mode being such that the piston rod is displaced in one direction, the second stroke mode being such that the piston rod is displaced in the opposite direction;

a first fluid path provided in said piston for allowing fluid flow from said first fluid chamber to said second fluid chamber in the first stroke mode, said first fluid path including inner and outer grooves in a surface of said piston opposing said second fluid chamber which are blocked from said second fluid chamber by a first valve plate, the inner groove being communicated with said first fluid chamber and also communicated with the outer groove;

a first rotary shaft disposed through said piston rod for defining a variable orifice within said first fluid path to restrict fluid flow between the inner and outer grooves, said rotary shaft being displaced dependent upon rotation thereof to traverse said first fluid path for varying a path area of the variable orifice for varying magnitude of flow restriction;

a second fluid path provided in said piston for allowing fluid flow from said second fluid chamber to said first fluid chamber in the second stroke mode, said second fluid path including inner and outer grooves in a surface of said piston opposing said first fluid chamber which are blocked from said first fluid chamber by a spring biased second valve plate, the inner groove of said second fluid path being communicated with said second fluid chamber and also communicated with the outer groove of said second fluid path;

valve adjusting means for adjusting the spring force of the second valve plate to block the inner and outer grooves of said second fluid path; and a second rotary shaft disposed through said first rotary shaft which is rotatable independent of the rotation of said first rotary shaft for operating said valve adjusting means to establish fluid communication between the outer groove of said second fluid path and said first fluid chamber in response to fluid pressure in said second fluid path which is lower than a preselected level and fluid communication between the inner groove of said second fluid path and said first fluid chamber in addition to the fluid communication between the outer groove and the first fluid chamber in response to fluid pressure in said second fluid path higher than the preselected level to provide desired flow restriction to fluid flow from said first fluid chamber to said second fluid chamber through said second fluid path.

18. A variable damping force shock absorber as set forth in claim 17, wherein said first rotary shaft is displaced dependent upon rotation thereof to traverse said first fluid path for variation in the path area of the variable orifice.

19. A variable damping force shock absorber as set forth in claim 18, wherein said first rotary shaft is engaged with the piston rod in a rotatable fashion to be displaced dependent upon its rotation to traverse said first fluid path for variation in the path area of the variable orifice.

20. A variable damping force shock absorber as set forth in claim 18, wherein said valve adjusting means includes a coil spring and a spring force adjusting means which urges the coil spring against the second valve plate, the valve adjusting means being responsive to rotation of said second rotary shaft to control spring force of the coil spring.

21. A variable damping force shock absorber as set forth in claim 20, wherein the spring force adjusting means includes a first member which is fixed on an end portion of the piston rod and a second member which is engaged with the first member in a screw fashion rotatable relative to the first member, said second member retaining the coil spring in contact with the second valve plate, the second member being responsive to rotation of said second rotary shaft to be displaced relative to the first member for adjusting the spring force of the coil spring.

* * * * *